United States Patent
Zhou

(10) Patent No.: US 6,388,616 B1
(45) Date of Patent: May 14, 2002

(54) SIMPLE TRUE-TIME-DELAY GENERATOR FOR OPTICAL CONTROL OF PHASED ARRAY ANTENNA

(75) Inventor: Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/595,542

(22) Filed: Jun. 16, 2000

(51) Int. Cl.⁷ .......................... H01Q 3/22; G02B 26/00
(52) U.S. Cl. ...................................... 342/375; 359/290
(58) Field of Search ................................ 342/368, 375; 359/290

(56) References Cited

U.S. PATENT DOCUMENTS 5,796,510 A  *  8/1998  Yao .............................. 359/256
6,195,195 B1 *  2/2001  Chethik ....................... 359/290

OTHER PUBLICATIONS

Frigyes, Istvan et al, "Optically Generated True Time Delay in Phased Array Antennas", IEEE Trans. on Microwave Theory and Techniques, vol. 43, No. 9, Sep. 1995.*

* cited by examiner

Primary Examiner—Gregory C. Issing
(74) Attorney, Agent, or Firm—Paul Clohan

(57) ABSTRACT

A true time delay system for optical control of a phased array antenna includes a first time delay unit having a pair of parallel end walls having mirrored surfaces facing each other in a zigzag pattern, and an intermediate wall which is substantially parallel to the end walls and has mirrored surfaces on both sides which match the end walls. The intermediate wall also has matching openings in the mirrored surfaces to permit light to pass through the intermediate wall. A displacement unit displaces the intermediate wall relative to the end walls to change the distance that a series of input light beams travels, creating a true time delay between each two consecutive light beams in a first dimension. A second time delay unit receives the output of the first time delay unit, provides a time delay between each two consecutive light beams in a second dimension and outputs light beams having a sequence of time delay in both the first and second dimensions.

23 Claims, 6 Drawing Sheets

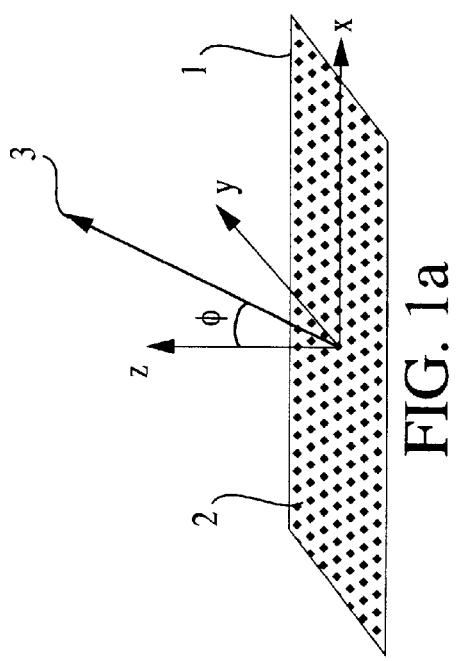
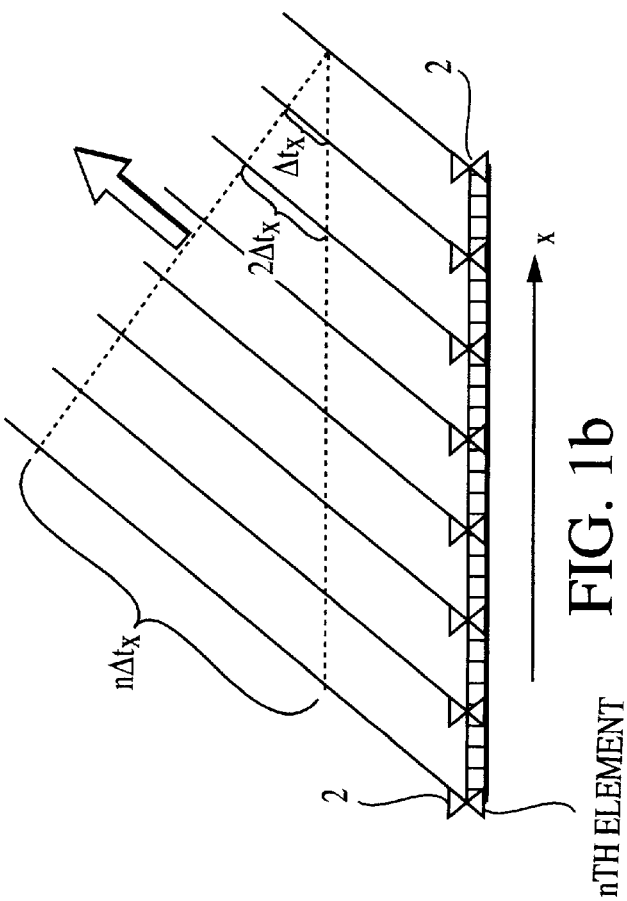
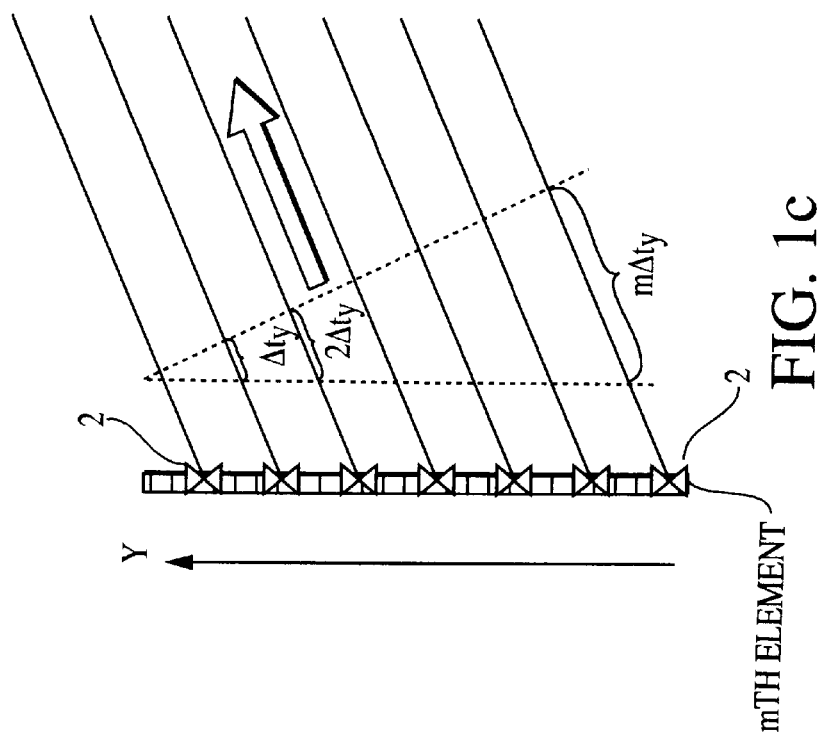
FIG. 1a
FIG. 1b
FIG. 1c

SIMPLE TRUE-TIME-DELAY GENERATOR FOR OPTICAL CONTROL OF PHASED ARRAY ANTENNA

BACKGROUND OF THE INVENTION

1. Field of the Invention

The present invention relates to the field of optically controlled phased array antenna/radar systems. More particularly, the present invention relates to a system for creating continuous true time delays in a photonic beam array system, which is used to produce a microwave beam array with the same time delays to control/steer the propagation direction of the phased array antennas.

2. Description of the Related Art

Phased array antenna systems are well known in the art. A phased array may be used to point a fixed radiation pattern or to scan rapidly in azimuth or elevation.

Such systems can be used, for example, in a tracking system for tracking objects of interest such as aircraft or missiles, and in a high data rate wireless mobile communication system.

In order to steer a microwave beam from a phased array antenna, it is necessary to create a time delay t between the electromagnetic waves generated from each of the neighboring antenna elements in a particular direction.

Traditionally, the time delay in a phased array antenna system has been made by a microwave electronic delay device or an electronic phase shifter (which is not even a true time delay device). However, given the large number of antenna array elements needed, it is necessary to use a large number of delay devices and waveguides (cables), making the overall system very bulky and expensive. Moreover, such systems yield poor quality results.

In the last ten years or so, there have been extensive efforts to develop an optically controlled phased array antenna, in which time delays are generated in the optical domain and then are carried over to the microwave domain using optical fibers. However, most of such proposed schemes have failed because of significant technical difficulties or very expensive material and assembly costs due to their system complexity.

Thus, there exists a need in the art for a simplified and inexpensive system for generating a true time delay in a phased antenna array system.

SUMMARY OF THE INVENTION

Accordingly, it is an object of the present invention to provide a simplified and inexpensive true time delay device for optical control of a phased array antenna system.

To this end, according to the present invention, there is provided a true time delay system for optical control of a phased array antenna including a first time delay unit having a pair of parallel end walls having mirrored surfaces facing each other in a zigzag pattern, and an intermediate wall which is substantially parallel to the end walls and has mirrored surfaces on both sides which match the end walls. The intermediate wall also has matching openings in the mirrored surfaces to permit light to pass through the intermediate wall. A displacement unit displaces the intermediate wall relative to the end walls to change the distance that a series of input light beams travels, creating a true time delay in a first dimension. A second time delay unit receives the output of the first time delay unit, provides a time delay in a second dimension and outputs light beams having a time delay in both the first and second dimensions.

More particularly, the present invention is directed to a true time delay generator for optical control of a phased array antenna system having an array of antenna elements arrayed in a first dimension and a second dimension and having a number n of antenna elements in the first dimension and a number m of antenna elements in the second dimension, the generator comprising:

(a) first time delay means for providing a time delay for optical control of the phased array antenna system in the first dimension, the first time delay means for guiding a set of input light beams corresponding to the number n of antenna elements in the first dimension to provide an output comprising a first series of light beams, N in the total number, delayed relative to one another with an equal amount of time delay in the first dimension between each two consecutive light beams of the first series of light beams;

(b) splitter means for splitting each light beam of the first series of light beams to provide an output comprising N groups of M light beams;

(c) second time delay means for providing a time delay for optical control of the phased array antenna in a second dimension, the second time delay means for guiding the output of splitter means to provide an output comprising the N groups of M light beams in which the M light beams in each group are delayed relative to one another to have an equal amount of time delay between each two consecutive light beams in each group in the second dimension, the N groups of light beams constituting signals for optoelectric conversion for steering a propagation direction of the phased array antenna;

wherein the first time delay means comprises a delay generator unit and the second time delay means comprises N delay generator units, each of the delay generator units comprising:

(i) first and second end walls disposed substantially parallel to each other and forming a cavity therebetween, the first end wall having a first plurality of mirrors formed thereon and the second end wall having a second plurality of mirrors formed thereon to face the first plurality of mirrors;

(ii) an intermediate wall disposed between the first and second end walls and being substantially parallel thereto to form a first chamber and a second chamber in the cavity, the intermediate wall having a third and a fourth plurality of mirrors formed on opposite sides thereof to face respectively the first plurality of mirrors of the first end wall and the second plurality of mirrors of the second end wall, the intermediate wall having a series of apertures for passage of the input light beams from the first chamber to the second chamber; and (iii) displacement means, for example, a motor, for displacing one of (1) the intermediate wall relative to the first and second end walls and (2) the first and second end walls relative to the intermediate wall, so that an area of the first and second chambers is variable for changing a time delay of the optical path of the input light beams in the cavity.

The set of input light beams are input into the first chamber of the first delay means so as to impinge on one of the third mirrors of the intermediate wall of the first delay means and then to reflect between the third mirrors and the first mirrors of the first delay means before passing through the apertures of the first delay means into the second chamber of the first delay means and then to reflect between the fourth mirrors and the second mirrors of the first delay means before passing out of the second chamber of the first time delay means and to the splitter means and then to the N delay generator units of the second time delay means as the N groups of M light beams, and each of the N groups of M light beams are input into the first chamber of a respective one of the N delay generator units so as to impinge on one of the third mirrors of the intermediate wall of the respective one of the N delay generator units and then to reflect between the third mirrors and the first mirrors of the respective one of the N delay generator units before passing through the apertures of the respective one of the N delay generator units into the second chamber of the respective one of the N delay generator units and then to reflect between the fourth mirrors and the second mirrors of the respective one of the N delay generator units before passing out of the second chamber of the respective one of the N delay generator units.

The N delay generator units of the second time delay means may be vertically stacked such that all N first and second end walls are attached together rigidly, and all N intermediate walls are attached together and movable together by the displacement means. The true time delay generator may further comprise amplification means for amplifying the output of the first time delay means. The light source for providing the input light beams may be a light source array positioned at an end of the intermediate wall of the first time delay means and may be a series of collimated lasers. The first, second, third and fourth plurality of mirrors may be curved concavely for retaining a collimation of the input light beams from the light source. A series of collimating lenses may be arranged in optical paths of at least one of the first and second time delay means. The displacement means may displace the intermediate wall relative to the first and second end walls for varying the size of the first and second chambers.

The plurality of mirrors of the intermediate wall and the end walls may be plated with a metal from the group consisting of Au, Ag, Al and Cr. The first and second plurality of mirrors may be arranged in a matching zigzag pattern at approximately ±45° angles to a normal axis of the first and second walls respectively and having grating surfaces thereon and the third and fourth plurality of mirrors may be arranged in a zigzag pattern at approximately ±45° angles to a normal axis of the intermediate wall and matching, respectively, the zigzag patterns of the first and second plurality of mirrors. The first and second walls may be connected by a pair of rods and the intermediate wall may be mounted to slide on the pair of rods.

According to another aspect of the present invention, there is provided a true time delay generator, comprising
(a) first and second end walls disposed substantially parallel to each other and forming a cavity therebetween, the first end wall having a first plurality of mirrors formed thereon and the second end wall having a second plurality of mirrors formed thereon to face the first plurality of mirrors;
(b) an intermediate wall disposed between the first and second end walls and being substantially parallel thereto to form a first chamber and a second chamber in the cavity, the intermediate wall having a third and a fourth plurality of mirrors formed on opposite sides thereof to face respectively the first plurality of mirrors of the first end wall and the second plurality of mirrors of the second end wall, the intermediate wall having a series of apertures for passage of the input light beams from the first chamber to the second chamber; and
(c) displacement means for displacing one of (1) the intermediate wall relative to the first and second end walls and (2) the first and second end walls relative to the intermediate wall, so that an area of the first and second chambers is variable for changing a time delay of the optical path of the input light beams in the cavity. Mirrors.

According to yet another aspect of the present invention, there is provided a method of true time delay for optical control of a phased array antenna system having an array of antenna elements arrayed in a first dimension and a second dimension and having a number n of antenna elements in the first dimension and a number m of antenna elements in the second dimension, comprising the steps of:
(a) inputting a set of input light beams, corresponding to the number n of antenna elements in the first dimension, into a first chamber of a first delay unit so as to impinge on one of a plurality of third mirrors of an intermediate wall of the first delay unit;
(b) reflecting the set of input light beams between the third mirrors and a plurality of first mirrors of the first delay unit;
(c) passing the input light beams through a plurality of apertures formed in the first delay unit into a second chamber of the first delay unit;
(d) reflecting the input light beams within the second chamber between fourth mirrors formed on the intermediate wall and second mirrors formed on the second wall of the first delay unit;
(e) passing the input light beams out of the second chamber of the first time delay unit to provide an output comprising a first series of light beams, N in number, delayed relative to one another with an equal amount of time delay in the first dimension between each two consecutive light beams of the first series of light beams;
(f) splitting each light beam of the first series of light beams to provide an output comprising N groups of M light beams;
(g) providing the N groups of M light beams to respectively a first chamber of N delay generator units of a second time delay means so as to impinge on one of a plurality of third mirrors formed on an intermediate wall of the respective ones of the N delay generator units;
(h) reflecting the N groups of M light beams between the third mirrors and first mirrors formed on a first wall of the respective ones of the N delay generator units;
(i) passing the N groups of M light beams through the apertures of the respective ones of the N delay generator units into a second chamber of the respective ones of the N delay generator units;
(j) reflect the N groups of M light beams between fourth mirrors formed on a second wall of the respective ones of the N delay generator units and the second mirrors of the respective ones of the N delay generator units; and
(k) passing the N groups of M light beams out of the second chamber of the respective ones of the N delay generator units.

The method may comprise displacing one of (i) the first and second walls relative to the intermediate wall and (ii) the intermediate wall relative to the first and second end walls, to change a time delay of an optical path of light beams in the first and second chambers. The method may further comprise amplifying the output of the first time delay unit; and splitting the output amplified in step (v) for input to the plurality of N generator units of the second time delay unit. The method may further comprise collimating the series of input beams provided to the first delay unit.

BRIEF DESCRIPTION OF THE DRAWINGS

FIG. 1(a) illustrates a two-dimensional phased array antenna panel.

FIG. 1(b) depicts the x-component of the beam generated by the panel shown in FIG. 1(a).

FIG. 1(c) depicts the y-component of the beam generated by the panel shown in FIG. 1(a).

DETAILED DESCRIPTION OF THE PREFERRED EMBODIMENTS

The following embodiments of the present invention are provided for illustrative purposes only.

FIG. 1(a) shows a phased antenna array panel 1 which is optically controlled in accordance with the present invention. Antenna array panel 1 comprises an array of antenna elements 2 arranged in a series of rows and columns. Panel 1 emits a beam 3 which forms an angle with the z-axis normal to the surface of the antenna array panel 1.

FIG. 1(b) shows the x-component of beam 3, while FIG. 1(c) shows the y-component of beam 3. Between each two neighboring antenna elements in the x array, there is a time delay $t_x$ for the waves emitted/received by the elements, which causes a different traveling distance c $t_x$ (where c is the speed of light) for neighboring antenna elements 2. Therefore, for the nth antenna element in the x-direction, there is n $t_x$ time delay relative to the first antenna element 2 in the row. Similarly, for the y-direction, there is m $t_x$ time delay between the first and the mth antenna element.

Figure 2:
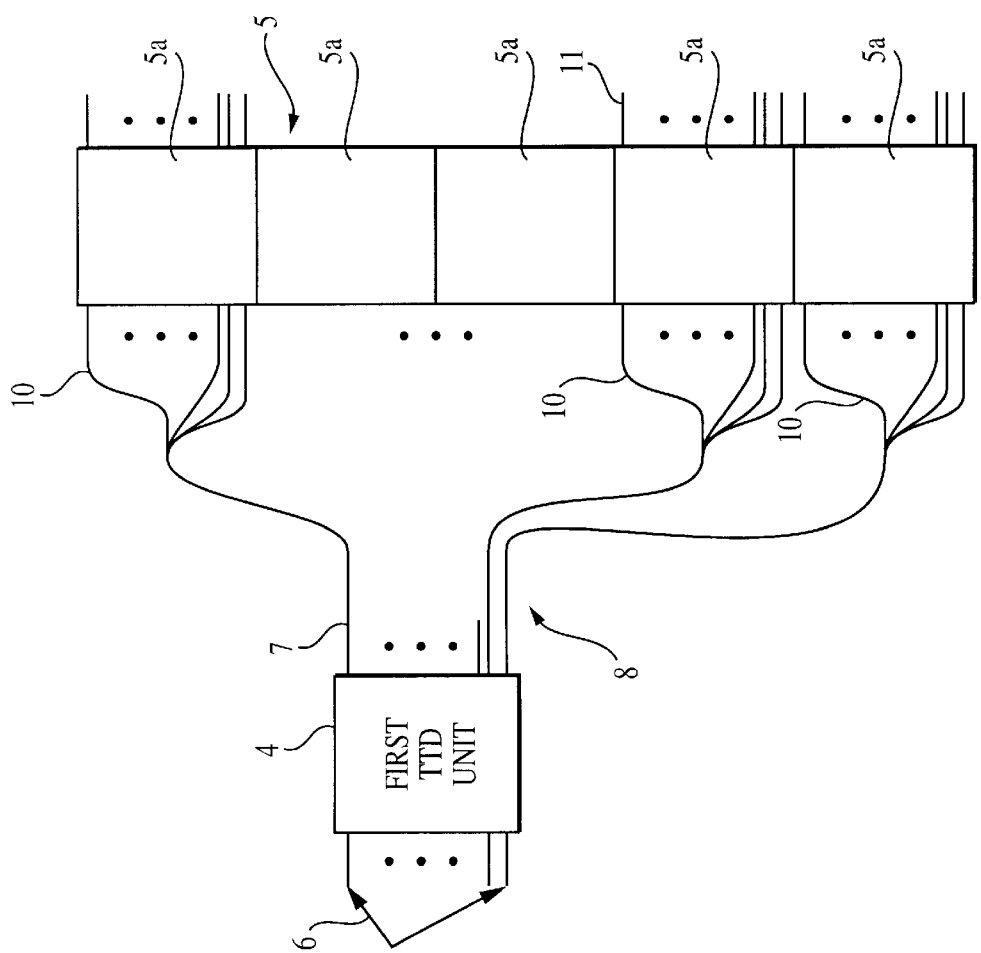
FIG. 2 is a block diagram of a true time delay generator of the present invention.

FIG. 2 is a block diagram of the true time delay generator of the present invention, which may produce up to N delay lines. This generator achieves two-dimensional steering by employing first and second units 4 and 5 for the optical control of the phased array antenna panel shown in FIG. 1(a). First unit 4 is for steering in the x-direction, and second unit 5 is for steering in the y-direction. Second unit 5 includes N vertically stacked sub-units 5a as shown. First and second units 4 and 5 operate on the same principle, except for the size and the number of total reflection mirror pairs M (discussed below), which matches the number of antenna elements m in the y-direction.

In FIG. 2, a plurality of input light beams 6, from 1 to N, are input to the first unit 4 and then output with a same amount of time delay between each two adjacent beams in the first dimension (x-direction). The N output beams will have respective time delays of 1 $t_x$, 2 $t_x$, 3 $t_x$, ... N $t_x$, where $t_x$ can be continuously varied from—$t_{max}$ to $t_{max}$, and $t_{max}$ is the time delay corresponding to the maximum angle of the beam steering in one direction.

The N output beams 7 from first TTD unit 4 (which may be amplified by amplifiers 8) are then input respectively to the sub-units 5a of second TTD unit 5 via M splitting units 10 associated with the M sub-units 5a respectively. The N beams 7 then undergo a time delay in the second dimension (y direction) to produce output light beams 11 from the second TTD unit 5, which have time delays N×M in the first and second dimensions (i.e. x and y directions) for optical control of the antenna array panel 1.

It will be understood by those of ordinary skill in the art that when the phased antenna array panel 1 is in transmission mode, the output beams 11 from the second TTD unit 5 may be read, for example, by photosensors (not shown) for conversion to electrical signals to control the antenna array panel 1 during the transmission.

It will be further understood by those of ordinary skill in the art that when the phased antenna array panel 1 is in reception mode, a series of laser diodes (not shown) can provide the optical conversion of the signals received by the antenna panel 1 for input to the TTD units 4,5.

Figure 3:
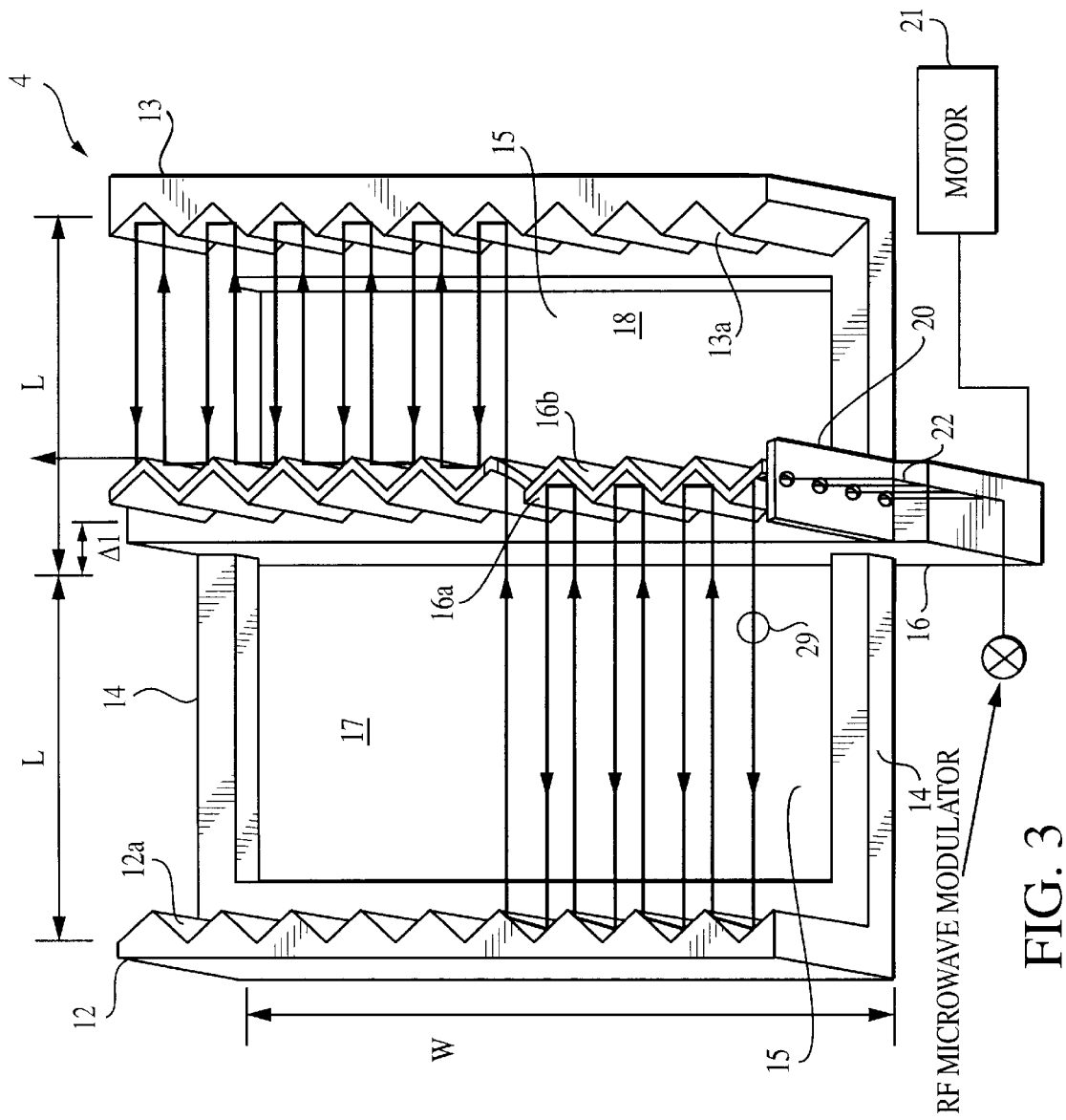
FIG. 3 shows details of the true time delay generator shown in FIG. 2.

FIG. 3 shows details of an embodiment of the first TTD unit 4 of the present invention. It should be noted that, although details of the first TTD unit 4 are described below, the second TTD unit 6 has a similar construction to the first TTD unit.

TTD unit 4 has a first end wall 12 and a second end wall 13, which are substantially parallel to each other and connected by rods 14 so as to form a cavity 15 having a length 2L and a width W.

First end wall 12 has formed thereon, on an inward facing side thereof, a first plurality of mirrors 12a. The first plurality mirrors 12a are arranged in a zigzag pattern at approximately ±45° angles from the normal direction of end wall 12.

Second end wall 13 also has formed thereon, on an inward facing side, a second plurality of mirrors 13a. The second plurality of mirrors 13a are arranged in a zigzag pattern, which matches the zigzag pattern 12a of the first end wall 12, at approximately ±45° angles from the normal direction of end wall 13.

First TTD unit 4 has an intermediate wall 16 which is disposed between and substantially parallel to the first and second end walls 12,13 so as to form a first chamber 17 and a second chamber 18 in cavity 15.

The intermediate wall 16 has two sides, respectively having formed thereon a third plurality of mirrors 16a and a fourth plurality of mirrors 16b. The third and fourth plurality of mirrors 16a,16b are arranged in zigzag patterns at approximately ±45° angles from the normal direction of wall 16. The zigzag patterns of mirrors 16a, 16b on each side of intermediate wall 16 matches the pattern of the mirrors of the respective end wall 12 or 13, which they face.

Intermediate wall 16 is slidably attached to connecting rods 14 to permit motion of intermediate wall 16 relative to end walls 12 and 13. Alternatively, the end walls could be mounted to slide relative to the intermediate wall.

Figure 4:
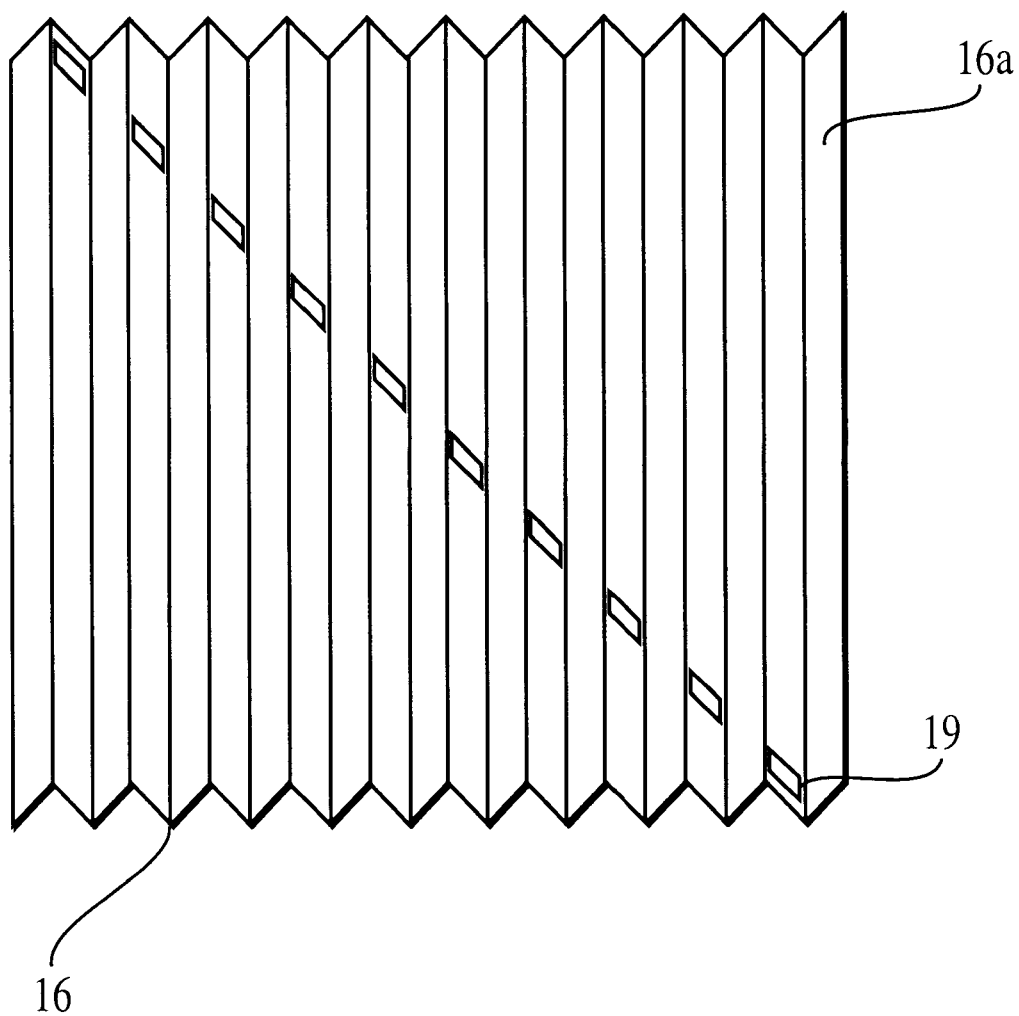
FIG. 4 is a face view of the intermediate wall of one of the TTD units in FIG. 3.

A diagonal series of apertures 19 (shown in FIG. 4) extends through intermediate wall 16 to permit passage of light beams from the first chamber 17 to the second chamber 18.

Light source array 20, which may comprise a series of collimated lasers or light sources, is arranged at an end of the intermediate wall 16 and provides collimated input beams to the TTD unit 4.

In order to retain the collimation of (or to collimate) the output of light source array 20, all of the mirrors of the end walls and intermediate wall may be curved concavely.

Alternately (or additionally), a series of collimating lenses, such as 29, may be provided in the optical path to obtain collimation of the light beams. It should be noted that the collimating lenses may be positioned at any advantageous position to achieve the desired collimating effect.

A displacement unit 21, typically a motor, displaces the intermediate wall 16 relative to the end walls 12 and 13 so as to vary the area of the second and first chambers 17 and 18.

When the intermediate wall 16 is arranged at the intermediate (or center) position, the true time delay unit 4 does not provide a time delay, because the first and second chambers 17 and 18 have an equal size and all of the light beams travel the same distance through the true time delay unit. Thus, the microwave beam front will propagate in the normal direction relative to antenna panel 1.

However, as shown in FIG. 3, when the intermediate wall 16 is displaced by l from the intermediate position, the Kth laser beam 22 ($4^{th}$ beam in the figure) makes K total reflections (in this case 4 round trips) in the first chamber 17, passes through an opening 19 (see FIG. 4) in the intermediate wall 16 and makes N−K total reflections (in this case 6 round trips) in the second chamber 18.

At the output of first TTD unit 4, the Kth beam travels a path of $X_k=2K(L+l)+2(N-k+1)(L-l)+W$ (where W is the width of the TTD unit 4 shown in FIG. 3). Therefore, the difference in the path length between two consecutive light beams (k and k+1) is 2 l. The first TTD unit 4 will generate an array of N light beams having 1(2 l), 2(2 l), 3((2 l), 4(2 l), . . . k(2 l) . . . N(2 l) in path difference, respectively. of course, if l is zero, the path differences will be zero.

When $t_x$=c2 l, where c is the speed of light, the TTD unit 4 then generates an array of light beams having a true time delay of 1 $t_x$,2 $t_x$,3 $t_x$, . . . N $t_x$, respectively, which corresponds to a steering of the microwave beam front to one direction from the phased array antenna panel 1.

When the intermediate wall 16 is moved to the first side position (−l), "negative" time delays correspond to a steering of the microwave in an opposite direction.

Mirrors 12a, 13a, 16a and 16b may be formed by plating with a metal such as Au, Ag, Al or Cr.

In addition, the gratings of the intermediate wall 16 and the end walls 12 and 13 should be larger than the light beam size and wavelength.

Finally, the height of the mirrors 12a, 13a, 16a and 16b should be sufficient to receive plural light beams at the same time.

Figure 5:
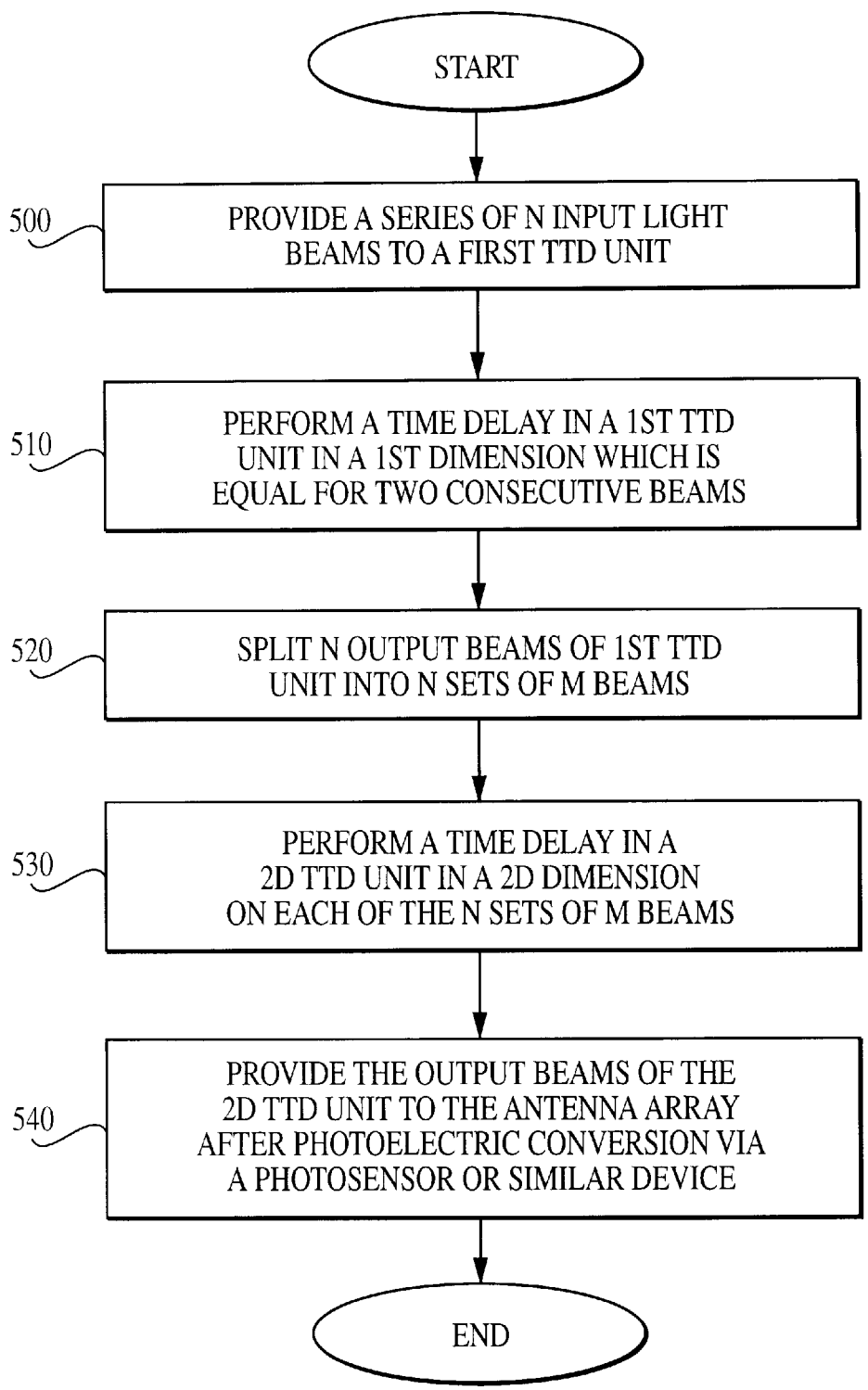
FIG. 5 is a flowchart illustrating a two-dimensional true time delay of the present invention.
Figure 6:
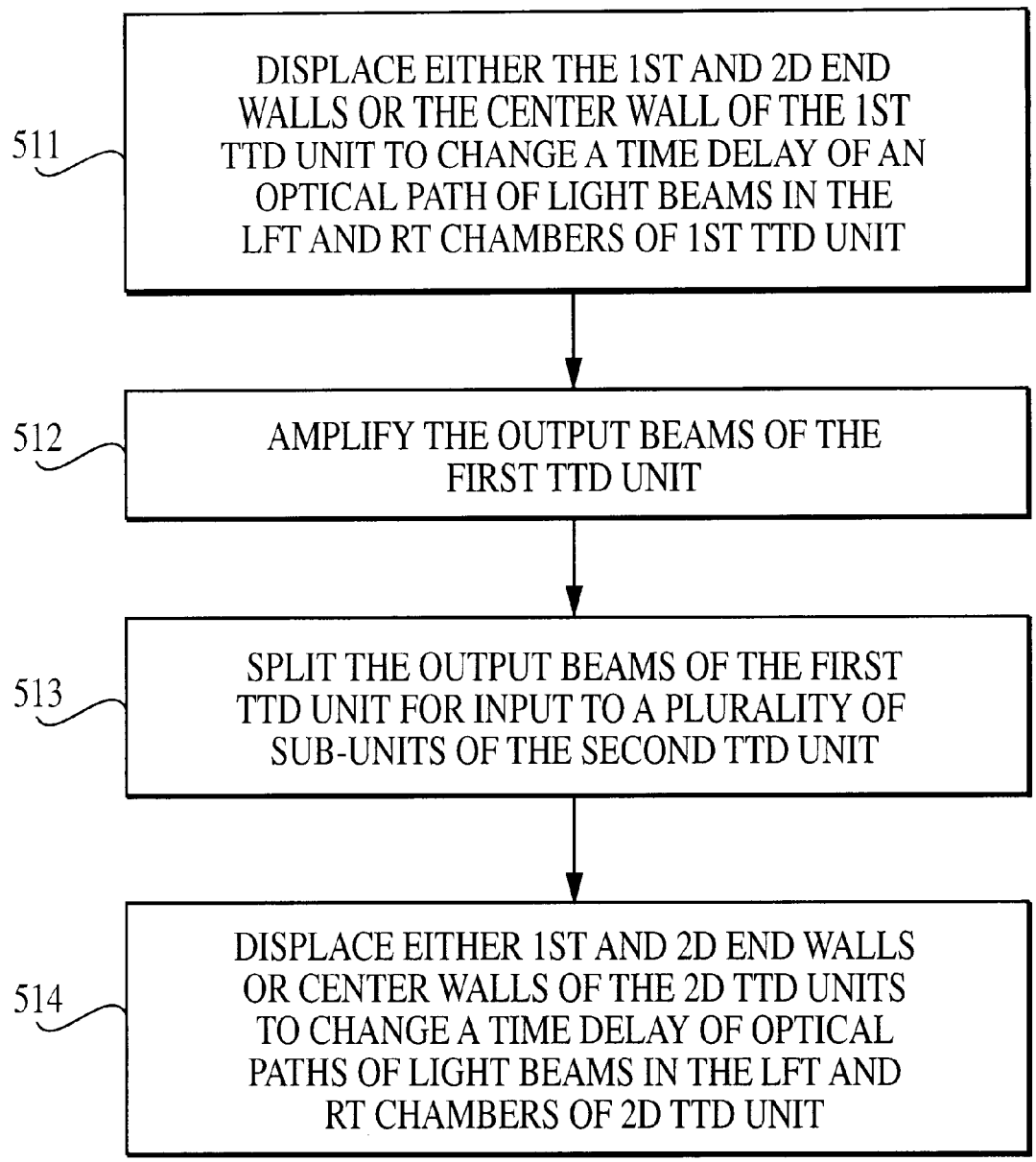
FIG. 6 shows details of sub-steps which correspond to step 510 in FIG. 5.

FIGS. 5 and 6 are flow charts illustrating the true time delay method of optical control of a phased array antenna according to the present invention.

At step 500, a series of light beams are provided to a first true time delay unit 4, for example, by a light source array 20 provided at an end of a intermediate wall 16 of the first TTD unit 4.

At step 510, the first TTD unit 4 performs a time delay which is equal for each two consecutive input beams for optical control of the phased array antenna elements 2 in a first dimension.

At step 520, the N beams output from the first TTD unit are split into N sets of M beams and are provided to the second TTD unit 5.

At step 530, a second TTD unit 5 receives the output of the first TTD unit 4 and performs a time delay for optical control of the phased array antenna elements 2 in a second dimension.

At step 540, the output of the second TTD unit 5, which has a time delay in the first and second dimensions, is output to the phased antenna array panel 1 for steering the propagation direction of a beam 3 emitted by the phased array antenna panel 1.

FIG. 6 is a flowchart which shows details of step 510 of FIG. 5.

Step 511 involves displacing either first and second end walls 12 and 13 relative to the intermediate wall 16 or the intermediate wall 16 relative to the first and second end walls 12 and 13, to change a time delay of an optical path of light beams in the first and second chambers 17 and 18.

Step 512 involves amplifying the output of the first time delay unit.

Step 513 involves splitting the output amplified in step 512 for input to a plurality of sub-units 5a of the second time delay unit 5.

Step 514 involves displacing either the first and second end walls 12 and 13 relative to the intermediate walls 16 or the intermediate walls 16 relative to the first and second end walls 12 and 13 of the subunits of the second TTD unit 5, to change a time delay of the optical paths of light beams in the first and second chambers 17 and 18 of the second unit 5.

It is noted that sub-steps 512 and 513 are optional, because the amplification (or the splitting) may not be necessary depending upon the number of sub-units 5a used in the second TTD unit 5.

The sub-steps of performing a time delay in the second TTD unit 5 is similar to those illustrated in FIG. 5 and 6, except that the input light beams are provided by the output of the first TTD unit 4 after passing through the beam splitters 10, and the output of the second TTD unit 5 is provided to the phased antenna array elements 2 via a photodetector array or similar devices (not shown) as microwave generators.

It is within the scope of the method of the present invention to collimate the series of input light beams which are provided to the first delay unit 4 by providing, for example, collimating lenses, such as element 29, in the optical path of each light beam, and/or providing each of the respective plurality of mirrors 12a, 13a, 16a and 16b with a concavely curved surface.

Further, in the above method, a distance between the gratings of the mirrors 12a, 13a, 16a and 16b should be larger than a size and wavelength of the input light beams, and the height of the mirrors 12a, 13a, 16a and 16b should be high enough to receive plural light beams at the same time.

Although the present invention has been fully disclosed by way of examples with reference to the accompanying drawings, it should be understood that numerous variations, modifications and substitutions will be apparent to those skilled in the art without departing from the novel spirit and scope of this invention.

For example, the first and second walls may be supported independently and need not be connected by connecting rods; for example, tracks may be used to guide/retain the walls during displacement, and the displacement device could be any structure for moving the walls and need not be a motor. Also, any desired number of light beams may be employed. Moreover, in some applications, the time delay for each two consecutive beams need not be equal; any desired arrangement to achieve various true time delays of different antenna elements relative to the first antenna element in the row or column may be designed. It will be further apparent that various shapes of the mirrors of the end walls and the intermediate wall may be utilized. In addition, the series of apertures in the intermediate wall can be in an arrangement other than diagonal to achieve a desired set of true time delays. Another example, instead having N vertically stacked TTD generator units for the second dimension time delay, a large single TTD generator unit can be used by having the N groups of M light beams sharing different part of the Moreover, optical path switching devices other than mirrors may be employed to switch the light beams along different length optical paths prior to exiting the TTD device. Another example, instead having N vertically stacked TTD generator units for the second dimension time delay, a large single TTD generator unit can be used by having the N groups of M light beams sharing different part of the mirrors.

What is claimed is:

1. A true time delay generator for optical control of a phased array antenna system having an array of antenna elements arrayed in a first dimension and a second dimension and having a number N of antenna elements in said first dimension and a number M of antenna elements in said second dimension, said generator comprising:

(a) first time delay means for providing a time delay for optical control of said phased array antenna system in said first dimension, said first time delay means for guiding a set of input light beams corresponding to said number N of antenna elements in said first dimension to provide an output comprising a first series of light beams, N in number, delayed relative to one another with an equal amount of time delay in said first dimension between each two consecutive light beams of said first series of light beams;

(b) splitter means for splitting each light beam of said first series of light beams to provide an output comprising N groups of M light beams;

(c) second time delay means for providing a time delay for optical control of said phased array antenna in a second dimension, said second time delay means for guiding said output of splitter means to provide an output comprising said N groups of M light beams in which said M light beams in each one of said groups are delayed relative to one another to have an equal amount of time delay between each two consecutive light beams in said each one of said groups in said second dimension, said N groups of light beams constituting signals for subsequent opto-electric conversion for steering a propagation direction of said phased array antenna;

wherein said first time delay means comprises a delay generator unit and said second time delay means comprises N attached delay generator units, each of said delay generator units comprising:

(i) first and second end walls disposed substantially parallel to each other and forming a cavity there between, the first end wall having a first plurality of mirrors formed thereon and the second end wall having a second plurality of mirrors formed thereon to face the first plurality of mirrors;

(ii) an intermediate wall disposed between said first and second end walls and being substantially parallel thereto to form a first chamber and a second chamber in said cavity, said intermediate wall having a third and a fourth plurality of mirrors formed on opposite sides thereof to face respectively the first plurality of mirrors of said first end wall and said second plurality of mirrors of said second end wall, said intermediate wall having a series of apertures for passage of the input light beams from the first chamber to the second chamber; and (iii) displacement means for displacing one of (1) said intermediate wall relative to said first and second end walls and (2) said first and second end walls relative to said intermediate wall, so that an area of the first and second chambers is variable for changing a time delay of the optical path of the input light beams in the cavity.

2. The true time delay generator according to claim 1, wherein said set of input light beams are input into said first chamber of said first delay means so as to impinge on one part of said third mirrors of said intermediate wall of said first delay means and then to reflect between said third mirrors and said first mirrors of said first delay means before passing through said apertures of said first delay means into said second chamber of said first delay means and then to reflect between said fourth mirrors and said second mirrors of said first delay means before passing out of said second chamber of said first time delay means and to said splitter means and then to said N delay generator units of said second time delay means as said N groups of M light beams, and each of said N groups of M light beams are input into said first chamber of a respective one of said N delay generator units so as to impinge on one part of said third mirrors of said intermediate wall of said respective one of said N delay generator units and then to reflect between said third mirrors and said first mirrors of said respective one of said N delay generator units before passing through said apertures of said respective one of said N delay generator units into said second chamber of said respective one of said N delay generator units and then to reflect between said fourth mirrors and said second mirrors of said respective one of said N delay generator units before passing out of said second chamber of said respective one of said N delay generator units.

3. The true time delay generator according to claim 1, wherein said N delay generator units of said second time delay means are vertically stacked and movable together by said displacement means.

4. The true time delay generator according to claim 1 further comprising amplification means for amplifying said output of said first time delay means.

5. The true time delay generator according to claim 1, further comprising a light source for providing the input light beams, said light source array being positioned at an end of said intermediate wall of said first time delay means.

6. The true time delay generator according to claim 5, wherein said light source comprises a series of collimated lasers.

7. The true time delay generator according to claim 5, wherein the first, second, third and fourth plurality of mirrors are curved concavely for retaining a collimation of said input light beams from said light source.

8. The true time delay generator according to claim 5, wherein a series of collimating lenses are arranged in optical paths of at least one of said first and second time delay means.

9. The true time delay generator according to claim 1, wherein said displacement means comprises a motor.

10. The true time delay generator according to claim 9, wherein said motor displaces said intermediate wall relative to said first and second end walls for varying the size of the first and second chambers.

11. The true time delay generator according to claim 1, wherein the plurality of mirrors of said intermediate wall and said end walls are plated with a metal from the group consisting of Au, Ag, Al and Cr.

12. The true time delay generator according to claim 1, wherein said first and second plurality of mirrors are arranged in a matching zigzag pattern at approximately ±45° angles to a normal axis of said first and second walls respectively and having grating surfaces thereon and said third and fourth plurality of mirrors being arranged in a zigzag pattern at approximately ±45° angles to a normal axis of said intermediate wall and matching, respectively, the zigzag patterns of the first and second plurality of mirrors.

13. The true time delay generator according to claim 10, wherein said first and second walls are connected by a pair of rods and said intermediate wall is mounted to slide on said pair of rods.

14. A true time delay generator, comprising
   (a) first and second end walls disposed substantially parallel to each other and forming a cavity therebetween, the first end wall having a first plurality of mirrors formed thereon and the second end wall having a second plurality of mirrors formed thereon to face the first plurality of mirrors;
   (b) an intermediate wall disposed between said first and second end walls and being substantially parallel thereto to form a first chamber and a second chamber in said cavity, said intermediate wall having a third and a fourth plurality of mirrors formed on opposite sides thereof to face respectively the first plurality of mirrors of said first end wall and said second plurality of mirrors of said second end wall, said intermediate wall having a series of apertures for passage of the input light beams from the first chamber to the second chamber; and
   (c) displacement means for displacing one of (1) said intermediate wall relative to said first and second end walls and (2) said first and second end walls relative to said intermediate wall, so that an area of the first and second chambers is variable for changing a time delay of the optical path of the input light beams in the cavity.

15. The true time delay generator according to claim 14, wherein said displacement means comprises a motor.

16. The true time delay generator according to claim 15, wherein said motor displaces said intermediate wall relative to said first and second end walls for varying the size of the first and second chambers.

17. The true time delay generator according to claim 14, wherein the plurality of mirrors of said intermediate wall and said end walls are plated with a metal from the group consisting of Au, Ag, Al and Cr.

18. The true time delay generator according to claim 14, wherein said first and second plurality of mirrors are arranged in a matching zigzag pattern at approximately ±45° angles to a normal axis of said first and second walls respectively thereon and said third and fourth plurality of mirrors being arranged in a zigzag pattern at approximately ±45° angles to a normal axis of said intermediate wall and matching, respectively, the zigzag patterns of the first and second plurality of mirrors.

19. The true time delay generator according to claim 14, wherein said first and second walls are connected by a pair of rods and said intermediate wall is mounted to slide on said pair of rods.

20. Method of true time delay for optical control of a phased array antenna system having an array of antenna elements arrayed in a first dimension and a second dimension and having a number N of antenna elements in said first dimension and a number M of antenna elements in said second dimension, comprising the steps of:
   (a) inputting a set of input light beams, corresponding to said number N of antenna elements in said first dimension, into a first chamber of a first delay unit so as to impinge on one of a plurality of third mirrors of an intermediate wall of said first delay unit;
   (b) reflecting said set of input light beams between said third mirrors and a plurality of first mirrors of said first delay unit; (for the nth beam, $1 \leq n \leq N$, n total reflections are made in the first chamber)
   (c) passing said input light beams through a plurality of apertures formed in said first delay unit into a second chamber of said first delay unit;
   (d) reflecting said input light beams within said second chamber between fourth mirrors formed on said intermediate wall and second mirrors formed on said second wall of said first delay unit; (for the nth beam N-n total refections are made in the second chamber)
   (e) passing said input light beams out of said second chamber of said first time delay unit to provide an output comprising a first series of light beams, N in number, delayed relative to one another with an equal amount of time delay in said first dimension between each two consecutive light beams of said first series of light beams;
   (f) splitting each light beam of said first series of light beams to provide an output comprising N groups of M light beams;
   (g) providing said N groups of M light beams to respectively a first chamber of N delay generator units of a second time delay means so as to impinge on one of a plurality of third mirrors formed on an intermediate wall of said respective ones of said N delay generator units;
   (h) reflecting said N groups of M light beams between said third mirrors and first mirrors formed on a first wall of said respective ones of said N delay generator units;
   (i) passing said N groups of M light beams through said apertures of said respective ones of said N delay generator units into a second chamber of said respective ones of said N delay generator units;
   (j) reflect said N groups of M light beams between fourth mirrors formed on a second wall of said respective ones of said N delay generator units and said second mirrors of said respective ones of said N delay generator units; and
   (k) passing said N groups of M light beams out of said second chamber of said respective ones of said N delay generator units.

21. The method according to claim 20, further comprising displacing one of (i) the first and second walls relative to the intermediate wall and (ii) the intermediate wall relative to the first and second end walls, to change a time delay of an optical path of light beams in the first and second chambers.

22. The method according to claim 20, further comprising amplifying the output of the first time delay unit; and splitting the output amplified in step (v) for input to said plurality of N generator units of the second time delay unit.

23. The method according to claim 20, further comprising collimating the series of input beams provided to the first delay unit.

* * * * *